UNITED STATES PATENT OFFICE.

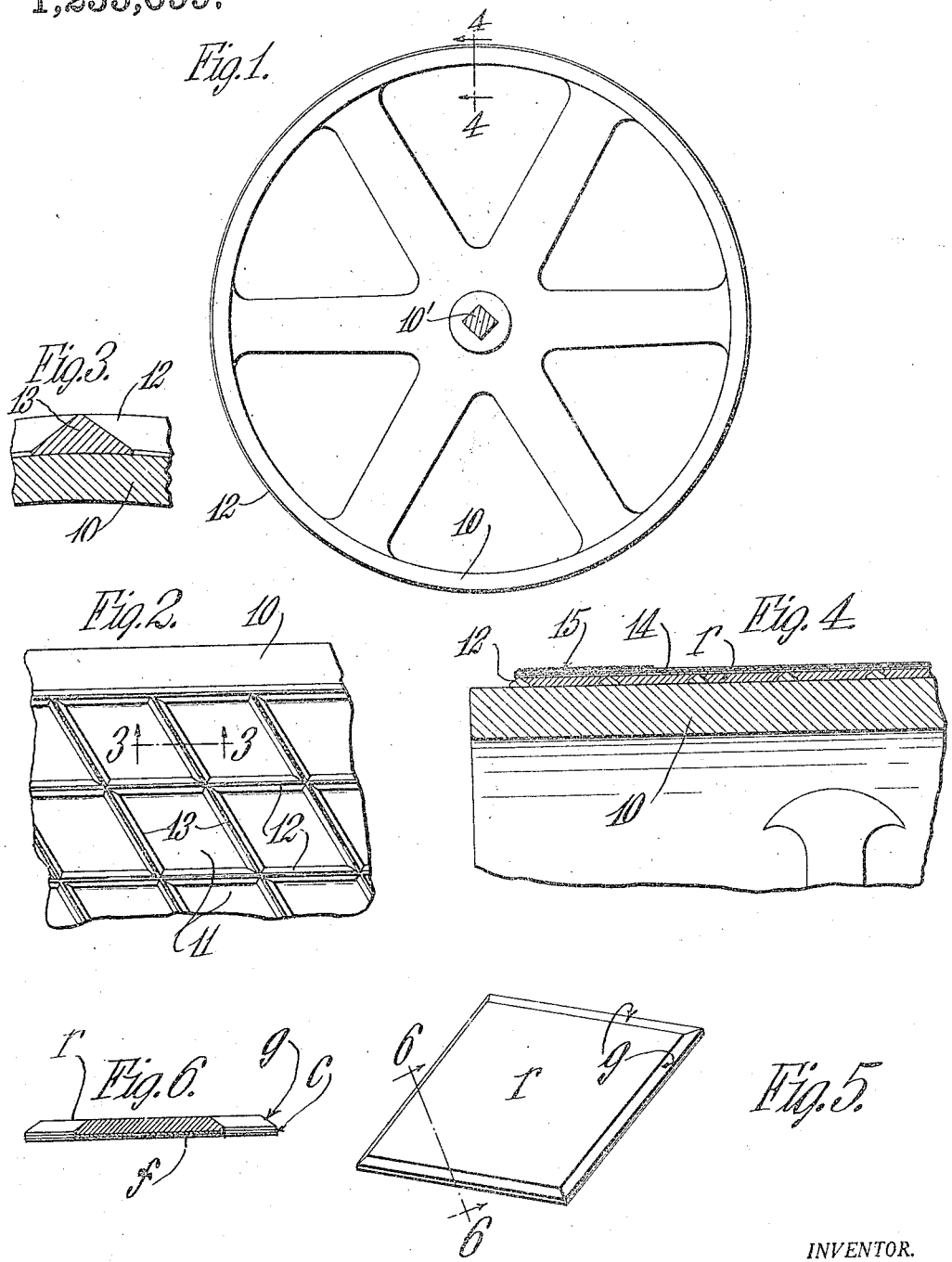

GEORGE H. LEWIS, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

METHOD AND APPARATUS FOR MOLDING RUBBER GOODS.

1,255,099.   Specification of Letters Patent.   Patented Jan. 29, 1918.

Application filed August 24, 1917. Serial No. 187,951.

*To all whom it may concern:*

Be it known that I, GEORGE H. LEWIS, a citizen of the United States of America, residing at Chicopee Falls, in the county of Hampden and State of Massachusetts, have invented certain new and useful Improvements in Methods and Apparatus for Molding Rubber Goods, of which the following is a specification.

This invention relates to a method and apparatus for molding rubber goods, and to an improved article of manufacture which results from the method.

An object of the invention is to provide an improved method of molding rubber goods, which involves applying a layer of uncured rubber to the peripheral face of a drum, which is provided with a plurality of shallow molds separated by relatively thin dividing walls, in applying pressure by windings of fabric, wire, or the like to the layer to force it into the molds, and in vulcanizing the rubber while thus held to the drum, the method being particularly characterized in that the layer of uncured rubber is heavily scored on its under face only as it is forced into said molds.

Another object of the invention is to provide an apparatus to carry out the method which apparatus comprises a drum having upstanding, relatively thin, and preferably wedge-shaped dividing walls on its peripheral face for the purpose of forming a plurality of shallow molds, and means to hold the drum for rotation during the application of the uncured rubber sheet and the pressure winding layers, the drum being constructed to enter a vulcanizing apparatus to permit the rubber sheet to be vulcanized while held by the pressure windings.

Other objects and advantages will appear in the following description and will be pointed out in the appended claims.

The invention is disclosed for illustrative purposes in the accompanying drawings, in which—

Figure 1 is a side elevational view of an apparatus for carrying out the method;

Fig. 2 is an enlarged fragmentary plan view thereof;

Fig. 3 is a magnified fragmentary cross sectional view taken on the line 3—3 of Fig. 2;

Fig. 4 is an enlarged partial cross section taken on the line 4—4 of Fig. 1 and illustrates one step in the method;

Fig. 5 is a perspective view of the improved article resulting from the method; and Fig. 6 is a cross sectional view taken on the line 6—6 of Fig. 5.

Referring to these drawings, the apparatus consists of a drum 10, and on the outer peripheral face of the latter are a plurality of shallow mold forming recesses 11, which may be formed in any suitable manner but most conveniently by attaching spaced parallel circumferential strips 12 to the periphery of the drum and thereafter securing cross strips 13 to the drum between the strips 12. Thus, a number of rows of shallow molds with a large number of molds in each row are formed. The drum 10 is of such diameter with relation to the size of recesses 11 that each of the latter is substantially flat. Preferably the cross strips 13 are arranged at an angle to the axis of the drum, as shown, and such an arrangement results in molds of substantially diamond shape. The preferred cross sectional shape of the cross strips 13 is that of a wedge, as clearly shown in magnified form in Fig. 3, and it is to be understood that strips 12 are of like cross sectional shape. The drum construction is most convenient and is particularly preferred since pressure may be applied to material on the peripheral surface of drum 10 by circumferential wrappings of fabric, rope, wire, and like binding materials, and means are provided as the squared shaft 10', whereby the drum may be held for rotation during the application of the pressure windings.

According to the method, a sheet of uncured rubber is applied to the peripheral face of the drum and rests on the described dividing walls 12 and 13 and over the mouths of the shallow molds 11. Thus, a single sheet of rubber may be wrapped circumferentially about drum 10 or preferably the ends of the strip are first spliced to form an endless band which is then slipped over the drum as a cover. One or more layers of fabric 14 (Fig. 4) are then wrapped over the rubber sheet as a pressure winding. Increased pressure may be obtained by applying a circumferential winding of wire 15 or other suitable binding medium over the fabric layers 14, with successive convolutions substantially contiguous. The pressure applied as described results in forcing the rubber into the recesses 12, and the thickness of the strip of rubber is so chosen that, when pressure is applied to it, the recesses 11 will be filled slightly above the dividing walls 12 and 13. It will thus be obvious that the sheet of rubber is heavily scored only on its under face, and the several sections indicated by the score lines are still held together by thin fins of rubber forming with the sections a flat back for the sheet. The drum 10 is then removed to a vulcanizer, and the rubber is vulcanized while still held confined to the molds by the same pressure applying means.

After vulcanization the pressure windings 15 and 14 are removed and thereafter the vulcanized molded articles are also removed from the drum. The removal of the molded articles is facilitated by the arrangement whereby they are held together still in sheet form, although heavily scored. Thus, the vulcanized sheet of rubber may be slit diagonally across the face of the drum along the line of one of the dividing walls 13 and thereafter the articles may be stripped as a sheet from the molds on the drum. The molded articles are held together for a useful purpose, namely, to permit a sheet of tacky rubber, technically known as "bareback" to be applied conveniently to the unscored face of the sheet. Thereafter, a suitable protecting fabric c, as glazed or sized holland f, is applied over the layer c. The three superposed layers r, c, and f are then subdivided along the heavily scored division lines which results in a plurality of substantially flat diamond shaped articles, each having on one side heavily chamfered edges g, as shown in Fig. 6. The articles thus produced are particularly advantageous as repair patches for pneumatic tires. Thus, the holland f may be readily stripped from the tacky rubber layer c and, when the latter is washed with gasolene, the layer c becomes very sticky and forms an effective cementing medium to hold the patch r of vulcanized rubber to the inner tube.

The illustrated form of the apparatus is advantageous in that the drum readily lends itself to the provision of a large number of mold recesses of the desired conformation and in that the sheet of raw rubber and pressure windings may be most conveniently and expeditiously applied. The apparatus of the type disclosed is also advantageous in that it is adapted to enter a vulcanizing apparatus, whereby the uncured molded rubber may be vulcanized while held by the pressure windings.

The method is important as producing with a minimum of labor and time a large number of articles of the desired shape. The sheet of raw rubber, the layers of fabric and the binding wire may all be conveniently and expeditiously applied, since the drum 10 may be rotated to aid in these operations. The method is characterized particularly in that the sheet of rubber is heavily scored to indicate the line of and facilitate the subsequent subdivision of the sheet into articles and to produce the desired chamfer on the edges of the latter. By scoring the sheet without severing it, the articles are held together into sheet form so that they may be rapidly and conveniently removed from the molds and so the subsequent layers c and r may be expeditiously applied. The scoring is so deep that the actual severing operation of the three layers is readily accomplished and the score lines form guides to aid in the severing operation.

The invention has been disclosed in a form at present preferred for illustrative purposes, but the scope of the invention is more properly defined by the appended claims rather than by the foregoing description.

What I claim is—

1. A method of simultaneously molding a plurality of rubber articles which consists in applying a layer of uncured rubber to the periphery or face of a drum covered with a plurality of shallow molds which are slightly less in depth than the thickness of said layer, in applying pressure windings of fabric, wire and the like against the rubber layer to force it into the molds and thereby heavily score the under face of the layer and mark it off in its entirety into a plurality of articles, and in vulcanizing the uncured rubber while so held to the drum.

2. A method of molding rubber goods, which consists in applying a layer of uncured rubber to the periphery or face of a drum covered with shallow molds which are slightly less in depth than the thickness of said layer, in applying pressure windings of fabric, wire and the like against the rubber layer to force it into the molds and thereby heavily score the under face of the layer, in vulcanizing the uncured rubber while so held to the drum, and in dividing the cured sheet of rubber along the scored lines.

3. A method of molding rubber goods, which consists in applying a layer of uncured rubber to the periphery or face of a drum covered with shallow molds which are slightly less in depth than the thickness of said layer, in applying pressure windings of fabric wire and the like against the rubber layer to force it into the molds and thereby heavily score the under face of the layer, in vulcanizing the uncured rubber while so held to the drum, in removing the pressure windings, and in applying a layer of tacky rubber to the unscored face of the vulcanized sheet, all for the purpose described.

4. A method of molding rubber goods, which consists in applying a layer of uncured rubber to the periphery or face of a drum covered with shallow molds which are slightly less in depth than the thickness of said layer, in applying pressure windings of fabric, wire and the like against the rubber layer to force it into the molds and thereby heavily score the under face of the layer, in vulcanizing the uncured rubber while so held to the drum, in removing the pressure windings, in applying a layer of tacky rubber to the unscored face of the vulcanized sheet, in then applying a protecting layer of fabric over the tacky rubber, and in thereafter dividing the three superposed layers along the scored lines of the first layer, all for the purpose described.

5. A method of simultaneously molding a plurality of rubber articles, which consists in slipping an endless band of uncured rubber over the periphery or face of a drum covered with a plurality of shallow molds which are slightly less in depth than the thickness of said band, in applying pressure windings of fabric, wire and the like against the rubber to force it into the molds and thereby heavily score its under face and mark it off in its entirety into a plurality of articles, and in vulcanizing the uncured rubber while so held to the drum.

6. Apparatus for molding rubber goods, comprising, a drum, two intersecting series of upstanding dividing walls on the peripheral face of the drum to form shallow molds, and means to hold the drum for rotation, whereby a sheet of rubber may be laid over the face of the drum and pressure windings may be applied over said sheet to force it into the shallow molds, said drum being constructed to enter a vulcanizing apparatus, together with the rubber and pressure windings thereon.

7. Apparatus for molding rubber goods, comprising, a drum, wedge-shaped dividing walls on the peripheral face of the drum to form shallow molds, and means to hold the drum for rotation, whereby a sheet of rubber may be laid over the face of the drum and pressure windings may be applied over said sheet to force it into the shallow molds, said drum being constructed to enter a vulcanizing apparatus together with the rubber and pressure windings thereon.

8. Apparatus for molding rubber goods, comprising, a drum, parallel circumferential dividing walls on said drum, parallel cross walls on said drum and arranged at an angle to the drum's axis, whereby a plurality of shallow molds are formed, and means to hold the drum for rotation, whereby a sheet of rubber may be laid over the face of the drum and pressure windings may be applied over said sheet to force it into the shallow molds, said drum being constructed to enter a vulcanizing apparatus, together with the rubber and pressure windings thereon.

9. Apparatus for molding rubber goods, comprising, a drum, upstanding dividing walls on the peripheral face of the drum to form shallow molds, the diameter of the drum being so proportioned with relation to each mold that each mold is substantially flat, and means to hold the drum for rotation, whereby a sheet of rubber may be laid over the face of the drum and pressure windings may be applied over said sheet to force it into the shallow molds, said drum being constructed to enter a vulcanizing apparatus together with the rubber and pressure windings thereon.

GEORGE H. LEWIS.